US008566780B2

(12) United States Patent
Tolskyakov et al.

(10) Patent No.: US 8,566,780 B2
(45) Date of Patent: Oct. 22, 2013

(54) OBJECT MODEL BASED MAPPING

(75) Inventors: Andrey Tolskyakov, Redmond, WA (US); Mohammed Fadel Shatnawi, Bellevue, WA (US); Russell Allen Herring, Jr., Sammamish, WA (US); Justin Jiajun Hua, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1464 days.

(21) Appl. No.: 11/768,628

(22) Filed: Jun. 26, 2007

(65) Prior Publication Data

US 2009/0006440 A1 Jan. 1, 2009

(51) Int. Cl.
*G06F 9/44* (2006.01)

(52) U.S. Cl.
USPC .......... 717/104; 717/105

(58) Field of Classification Search
USPC .......... 717/104, 105
See application file for complete search history.

(56) References Cited

U.S. PATENT DOCUMENTS 5,627,979 A * 5/1997 Chang et al. .......... 715/763
5,692,169 A 11/1997 Kathail et al. .......... 712/244
5,729,739 A 3/1998 Cantin et al. .......... 395/614
5,737,601 A 4/1998 Jain et al. .......... 707/201
5,809,505 A * 9/1998 Lo et al. .......... 707/999.1
5,878,411 A * 3/1999 Burroughs et al. .......... 717/106
5,937,409 A * 8/1999 Wetherbee .......... 707/999.001
5,940,587 A 8/1999 Zimmer .......... 395/183.01
5,940,839 A 8/1999 Chen et al. .......... 707/202
5,956,725 A 9/1999 Burroughs et al. .......... 707/101
6,101,502 A * 8/2000 Heubner et al. .......... 707/999.103
6,233,585 B1 5/2001 Gupta et al. .......... 707/103
6,253,369 B1 * 6/2001 Cloud et al. .......... 717/136
6,363,435 B1 3/2002 Fernando et al. .......... 719/318
6,434,628 B1 8/2002 Bowman-Amuah .......... 714/48
6,526,416 B1 2/2003 Long .......... 707/202
6,704,862 B1 3/2004 Chaudhry et al. .......... 712/244
6,738,975 B1 5/2004 Yee et al. .......... 719/310
6,971,051 B2 11/2005 Taylor et al. .......... 714/718
6,996,566 B1 * 2/2006 George et al. .......... 707/999.1
7,020,880 B2 3/2006 Mellen-Garnett et al. .......... 719/310
7,047,243 B2 5/2006 Cabrera et al. .......... 707/10
7,127,474 B2 * 10/2006 Williamson et al. .......... 707/810
7,149,730 B2 12/2006 Mullins et al. .......... 707/2
7,171,585 B2 1/2007 Gail et al. .......... 714/25
7,200,530 B2 4/2007 Brown et al. .......... 703/1
7,606,681 B2 10/2009 Esmaili et al. .......... 702/187

(Continued)

FOREIGN PATENT DOCUMENTS

WO WO 2004/003745 A2 1/2004

OTHER PUBLICATIONS

Liu, et al. "High-order Object Model Based Software Analysis", 1997, IEEE, p. 228-231.*

(Continued)

*Primary Examiner* — Qamrun Nahar
(74) *Attorney, Agent, or Firm* — Merchant & Gould

(57) ABSTRACT

Object model based mapping may be provided. First, backend data may be received defining data constructs in a backend system. Then entity data may be received defining data constructs in an entity model. User selectable elements may then be received defining a process associating the backend data with the entity data. Next, code may be produced, based on the received user selectable elements, configured to implement the process.

20 Claims, 4 Drawing Sheets

(56) References Cited

U.S. PATENT DOCUMENTS

| | | | | |
|---|---|---|---|---|
| 7,747,899 | B2 | 6/2010 | Tolskyakov et al. | |
| 2005/0021355 | A1* | 1/2005 | Brendle et al. | 705/1 |
| 2005/0027575 | A1 | 2/2005 | Amitabh et al. | 705/8 |
| 2005/0097187 | A1 | 5/2005 | Thompson et al. | 709/217 |
| 2006/0029054 | A1 | 2/2006 | Breh et al. | 370/385 |
| 2006/0235548 | A1* | 10/2006 | Gaudette | 700/83 |
| 2006/0277024 | A1 | 12/2006 | Kloppmann et al. | 703/22 |
| 2007/0006237 | A1 | 1/2007 | Ghanaie-Sichanie et al. | 719/328 |
| 2007/0055692 | A1 | 3/2007 | Pizzo et al. | 707/103 R |
| 2007/0179975 | A1 | 8/2007 | Teh et al. | 707/104.1 |
| 2007/0226732 | A1* | 9/2007 | O'Flaherty et al. | 717/174 |
| 2007/0283146 | A1 | 12/2007 | Neveux | 713/166 |
| 2008/0127205 | A1 | 5/2008 | Barros | 719/313 |
| 2009/0006441 | A1 | 1/2009 | Tolskyakov et al. | 707/102 |
| 2009/0006908 | A1 | 1/2009 | Allen | 714/57 |

OTHER PUBLICATIONS

Jürg Gutknecht, "Active Oberon for .NET: A Case Study in Object Model Mapping," pp. 1-22, Aug. 10, 2001, http://www.es.inf.ethz.eh/_gutknechAODotNet.pdf.

"Client-Server Object Issues," 4 pgs., 1997-2000, http://www.chimu.com/publications/objectRelational/part0007.html.

Michael Rys et al., "Intra-Transaction Parallelism in the Mapping of an Object Model to a Relational Multi-Processor System," Proceedings of the 22nd VLDB Conference Mumbai (Bombay), India, 1996, pp. 460-471, http://www.sigmod.org/vldb/conf/1996/P460.PDF.

International Search Report dated Dec. 19, 2008 cited in Application No. PCT/US2008/067836, p. 1-9.

International Search Report dated Dec. 19, 2008 cited in Application No. PCT/US2008/067559, p. 1-10.

Bartek Kiepuszewski et al., "FlowBack: Providing Backward Recovery for Workflow Management Systems," DSTC Technical Report, DSTC-TR-9840, 7 pgs., http://citeseer.ist.psu.edu/cache/papers/cs/4522/http:zSzzSzwww.dstc.edu.auzSzD-DUzSzpublicationszSztech-reportszSzTR-9840.pdf/kiepuszewski98flowback.pdf.

A. Biliris et al., "ASSET: A System for Supporting Extended Transactions," SIGMOD 94-5/94 Minneapolis, MN, 1994, pp. 44-54, http://deliver.acm.org/10.1145/200000/191848/p44-biliris.pdf?key1=191848&key2=6889097711&coll=GUIDE&dl=GUIDE&CFID=21288866&CFTOKEN=93794674.

Mark Potts et al., "Business Transactions in Workflow and Business Process Management," OASIS Business Transactions Technical Committee Workflow sub-committee, 2001, pp. 1-14, http://www.ifi.uio.no/indis/v2002/handouts/2001-07-12.BTPModelForWF2.pdf.

Huanqing Lu, "Implementation of an Advanced Transaction Model for an Integrated Computing Environment for Building Construction," 2002, 85 pgs., http://etd.fcla.edu/UF/UFE1000138/lu_h.pdf.

U.S. Office Action dated Nov. 12, 2009 cited in U.S. Appl. No. 11/768,735, p. 1-22.

* cited by examiner

OBJECT MODEL BASED MAPPING

RELATED APPLICATION

Related U.S. patent application Ser. No. 11/768,735, filed on even date herewith in the name of Andrey Tolstyakov and entitled "Providing Mapping Fault Processing," which issued on Jun. 29, 2010 as U.S. Pat. No. 7,747,899 B2, assigned to the assignee of the present application, is hereby incorporated by reference.

BACKGROUND

An independent software vendor (ISV) is a business term for companies specializing in making or selling specialized software products, usually for niche markets comprising, for example, real estate brokers, scheduling for healthcare personnel, barcode scanning, and stock maintenance. Specialized software products generally offer higher productivity to organizations than more generalized software such as basic spreadsheet or database packages.

Most large software companies offer special programs for ISVs. Consequently, an ISV may make and sells software products that run on one or more computer hardware or operating system platforms made by the large software companies. The large software companies that make the platforms, encourage and lend support to ISVs, often with special "business partner" programs. In general, the more applications that run on a platform, the more value it offers to customers. Of course, platform manufacturers make applications as well, but do not have the resources and, in many cases, the special knowledge required to make them all.

SUMMARY

This Summary is provided to introduce a selection of concepts in a simplified form that are further described below in the Detailed Description. This Summary is not intended to identify key features or essential features of the claimed subject matter. Nor is this Summary intended to be used to limit the claimed subject matter's scope.

Object model based mapping may be provided. First backend data may be received defining data constructs in a backend system. Then entity data may be received defining data constructs in an entity model. User selectable elements may then be received defining a process associating the backend data with the entity data. Next, code may be produced, based on the received user selectable elements, configured to implement the process.

Both the foregoing general description and the following detailed description provide examples and are explanatory only. Accordingly, the foregoing general description and the following detailed description should not be considered to be restrictive. Further, features or variations may be provided in addition to those set forth herein. For example, embodiments may be directed to various feature combinations and subcombinations described in the detailed description.

BRIEF DESCRIPTION OF THE DRAWINGS

The accompanying drawings, which are incorporated in and constitute a part of this disclosure, illustrate various embodiments of the present invention. In the drawings.

DETAILED DESCRIPTION

Figure 1:
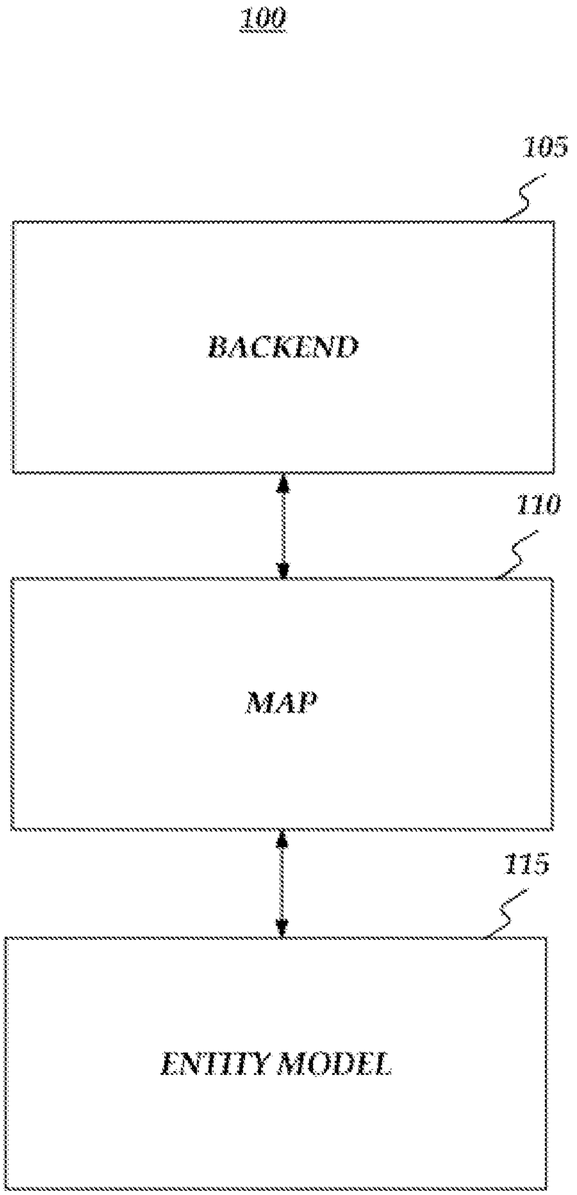
FIG. 1 is a block diagram of an operating environment.

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the proper scope of the invention is defined by the appended claims.

Object Model Based Mapping May Be Provided.

Conceptual entity programming is an emerging trend that ISVs are trying to use to overcome the problems of specific implementation and data access of databases and database technologies like customer relationship management (CRM). CRM is a term that covers concepts used by companies to manage their relationships with customers, including capture, storage, and analysis of customer information. Consistent with embodiments of the invention, a programming model that enables mapping a conceptual (entity) model to a backend may be provided. The backend may be, for example, a conceptual model itself, a relational database, or a set of application program interfaces (APIs). There may be no restrictions on the nature of the backend. Embodiments of the invention may have the following behavior to enable mapping between an entity model and a backend: i) ability to define both endpoints (e.g. entity model and backend); ii) ability to understand the properties, predicates, and behaviors of conceptual model, and translate those into pertinent functionality to be performed on the backend; iii) ability to customize a solutions provided for a specific design/implementation of a conceptual model and a specific type/version of the backend; iv) ability to customize at both a design time and/or runtime of a solution; and v) ability to package the solutions, ship, or deploy them independent of the backends.

For ISVs that define such a conceptual abstraction known as an entity model, the ability to map data between their abstract constructs known as entities (e.g. entity classes, data logical classes, etc.) and data constructs of backend systems their going against is desired. Such a mapping may include: i) data type transformation (e.g. strings to guides, integers to strings, concatenation of types, any mathematical transformation on a type, etc.); ii) backend end specification (e.g. which backend to map to, such as a structured query language (SQL) server, Microsoft customer relationship management (MSCRM) server, a SAP CRM server, a Siebel CRM server, etc.); and iii) which method to access the backend (e.g. via data access layers such as ActiveX Data Objects (e.g. Ado.Net) or Web service facades to the backend).

A problem faced by ISVs is that any ISV solution may not be a viable choice for customers without the ability to customize that solution. Customization may be important because any generic solution may not be what specific customers need for their specific conceptual (i.e. entity) model and their specific backends. Customers may have a different conceptual model, may interact with a different backend, may have different mapping requirements between their conceptual model and the backend, or any possible combination of these.

To address the aforementioned problems, (e.g. the mapping problem, design time customization, and runtime customization) embodiments of the invention may include a system and method that allow for the specification of the conceptual model and the backend to interact with as a set of interfaces. FIG. 1 shows a mapping system 100 consistent with embodiments of the invention. As shown in FIG. 1, system 100 may includes a backend 105, a map 110, and an entity model 115. For example, map 110 may include specific mapping predicates that have the ability to: i) define end points for the conceptual model to go against; and ii) define mapping/transformation logic between the two ends (e.g. entity model 115 and backend 105). For example, backend 105 may comprise a legacy banking system using a structured query language (SQL) server. Entity model 115 may comprise a conceptual model corresponding to a remote personal computer configured to perform online banking for example. Map 110 may perform bi-directional data transforms between entity model 115 and backend 105 as described in greater detail below.

Moreover, embodiments of the invention may have the following features. First, embodiments of the invention may have the ability to understand the conceptual model's signatures (i.e. as a set of interfaces). In addition, embodiments of the invention may be configured to define and access backend endpoints and to schedule actions and functionality to insure correctness of the mapping. In addition, embodiments of the invention may be configured to supply workflow/runtime like behavior (e.g. scheduling, error handling, event raising, and event handling, etc.). Also, embodiments of the invention may be configured to support programmable customization of the mapping solutions.

Figure 2:
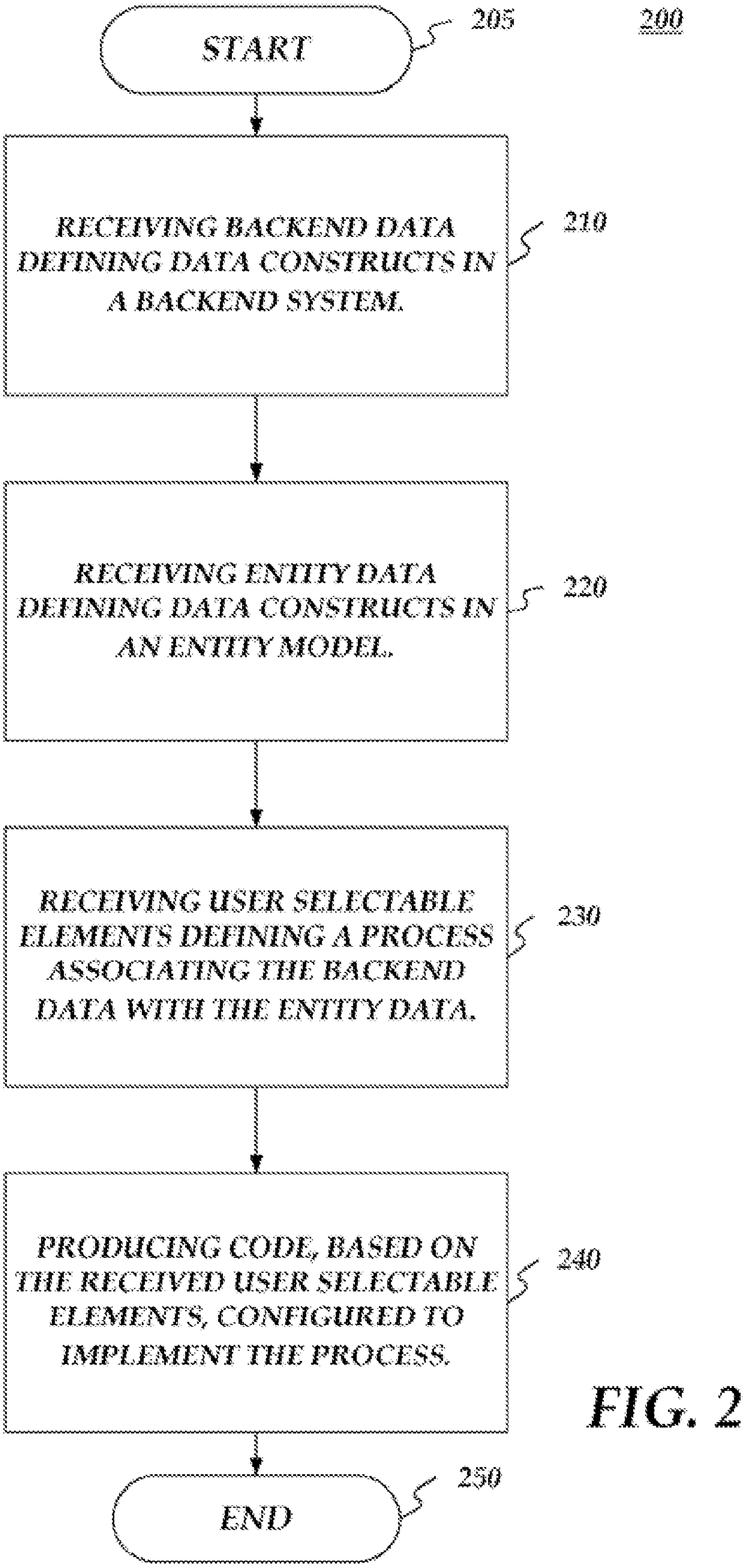
FIG. 2 is a flow chart of a method for providing object model based mapping.

FIG. 2 is a flow chart setting forth the general stages involved in a method 200 consistent with an embodiment of the invention for providing object model based mapping. Method 200 may be implemented using a computing device 400 as described in more detail below with respect to FIG. 4. Ways to implement the stages of method 200 will be described in greater detail below. Method 200 may begin at starting block 205 and proceed to stage 210 where computing device 400 may receive backend data defining data constructs for backend system 105. For example, the backend data may specify any information regarding backend system 105 in order for map 110 to provide object model based mapping between backend 105 and entity model 115. The backend data may specify which backend to map to, such as a structured query language (SQL) server, a Microsoft customer relationship management (MSCRM) server, a SAP CRM server, a Siebel CRM server, etc.). Furthermore, the backend data may specify which method to use to access backend system 105, for example, via data access layers such as ActiveX Data Objects (e.g. Ado.Net) or Web service facades to backend system 105.

From stage 210, where computing device 400 receives the backend data, method 200 may advance to stage 220 where computing device 400 may receive entity data defining data constructs in an entity model. For example, the entity data may specify any information regarding entity model 115 in order for map 110 to provide object model based mapping between backend 105 and entity model 115. For example, the entity data may specify the desired data or the desired data format for the input and output associated with entity model 115. Entity model 115 may comprise a customer's conceptual world.

Figure 3:
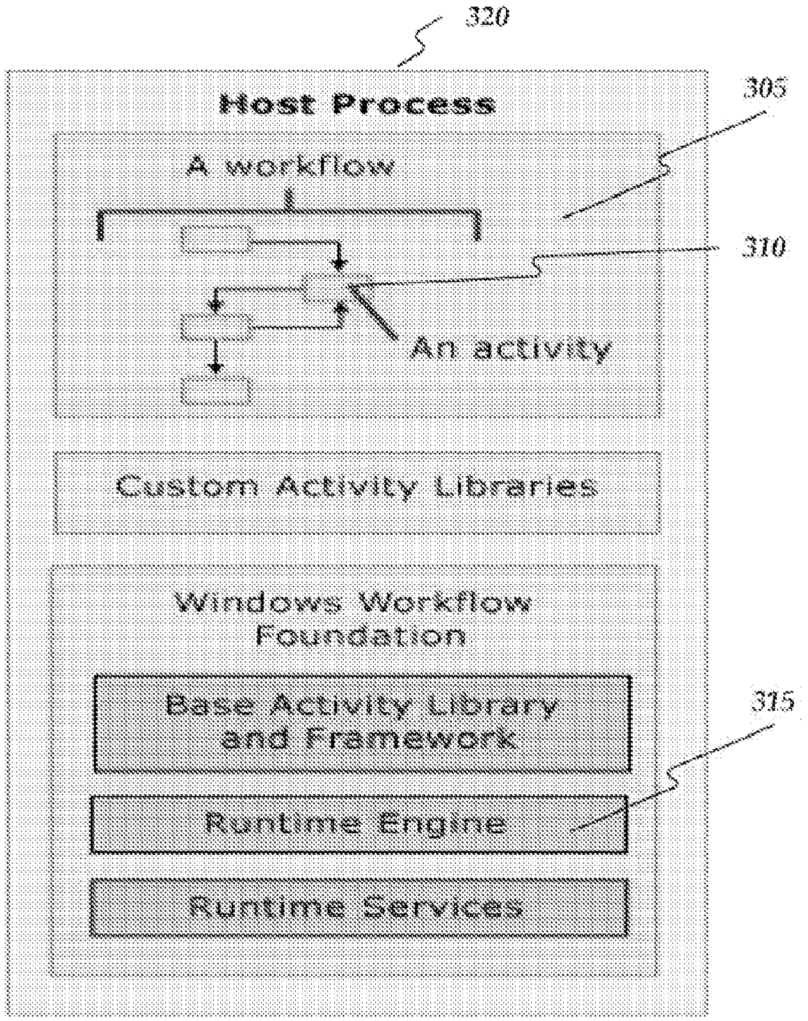
FIG. 3 is a diagram illustrating an object model.

Once computing device 400 receives the entity data in stage 220, method 200 may continue to stage 230 where computing device 400 may receive user selectable elements defining a process associating the backend data with the entity data. For example, the process may be defined by a flow chart (i.e. workflow) 305 as shown in FIG. 3. In order to define the process, computing device 400 may present a user with an interface configured to receive the user selectable elements defining the process as flow chart 305. The selectable elements may comprise activities including, for example, an activity 310. The activities in flow chart 305 may define map 110. As described in greater detail below, flow chart 305 may be translated by computing device 400 from flow chart 305's easy-readable format for human to machine code for computer execution.

In conventional systems, flowcharts and process schemes are done separately from code just as a way to organize ideas before writing the actual code. But when the task was finished in conventional systems, the scheme remained just as documentation. Also, the capacity of older conventional computers made it difficult to retain all the information of a workflow in memory, and it was difficult to translate from an easy-readable format for human to machine code in conventional systems. Software developers may find it easier writing a workflow instead of writing code. First, for developers, workflows may be easier to understand than code because workflows may provide a visual representation of the process. For example, adding an activity in flow chart 305 may be easier for a developer to do than re-writing code to include the activity. Consequently, non-programs may be able to write workflows thus producing code without having computer programming skills.

Moreover, there may be two main kinds of workflows: i) sequential; and ii) and state machine. With sequential workflows, actions may be executed in some predefined order with a beginning and an end. Examples of sequential workflows may include installations. With state machine workflows, these workflows may not have a path, but it may be represented as a set of states and transitions between states. Examples may include a web shop: you may need approval for mailing, the user could pay via credit card or with a cheque, and each user is in one state and may go to any order depending on previous questions.

After computing device 400 receives the user selectable elements in stage 230, method 200 may proceed to stage 240 where computing device 400 may produce code, based on the received user selectable elements, configured to implement the process. For example, computing device 400 may convert flow chart 305's activities (e.g. describing map 110) to machine code for execution on computing device 400. During execution, the code may perform mapping between entity model 115 and backend 105.

Workflow instances may be created and maintained by an in-process runtime engine, for example, a runtime engine 315. There can be several workflow runtime engines within an application domain, and each instance of the runtime engine can support multiple workflow instances running concurrently. When a workflow model is compiled, it can be executed inside any process including console applications, forms-based applications, Services, ASP.NET Web sites, and Web services. Because a workflow may be hosted in process, a workflow can communicate with its host application. For example, the workflow described in flow chart 305 may communicate with a host application 320. Once computing device 400 produces the code in stage 240, method 200 may then end at stage 250.

An embodiment consistent with the invention may comprise a system for providing object model based mapping. The system may comprise a memory storage and a processing unit coupled to the memory storage. The processing unit may be operative to receive backend data defining data constructs in a backend system and to receive entity data defining data constructs in an entity model. In addition, the processing unit may be operative to receive user selectable elements defining a process associating the backend data with the entity data. Furthermore, the processing unit may be operative to produce code, based on the received user selectable elements, configured to implement the process.

Another embodiment consistent with the invention may comprise a system for providing object model based mapping. The system may comprise a memory storage and a processing unit coupled to the memory storage. The processing unit may be operative to execute code configured to implement a process. The code may be produced based on received user selectable elements defining the process associating a backend data with an entity data. The backend data may define data constructs in a backend system and the entity data may define data constructs in an entity model.

Yet another embodiment consistent with the invention may comprise a system for providing object model based mapping. The system may comprise a memory storage and a processing unit coupled to the memory storage. The processing unit may be operative to receive backend data defining data constructs in a backend system. The backend data may be configured to define the backend system and to define how to access the backend system. In addition, the processing unit may be operative to receive entity data defining data constructs in an entity model. The entity data may define the data constructs comprising one of the following: entity classes and data logical classes. Moreover, the processing unit may be operative to receive user selectable elements defining a process associating the backend data with the entity data. The user selectable elements may define a flow chart of the process comprising at least one activity describing the process comprising one of the following: a sequential process and a state machines process. Also, the processing unit may be operative to produce code, based on the received user selectable elements, configured to implement the process.

Figure 4:
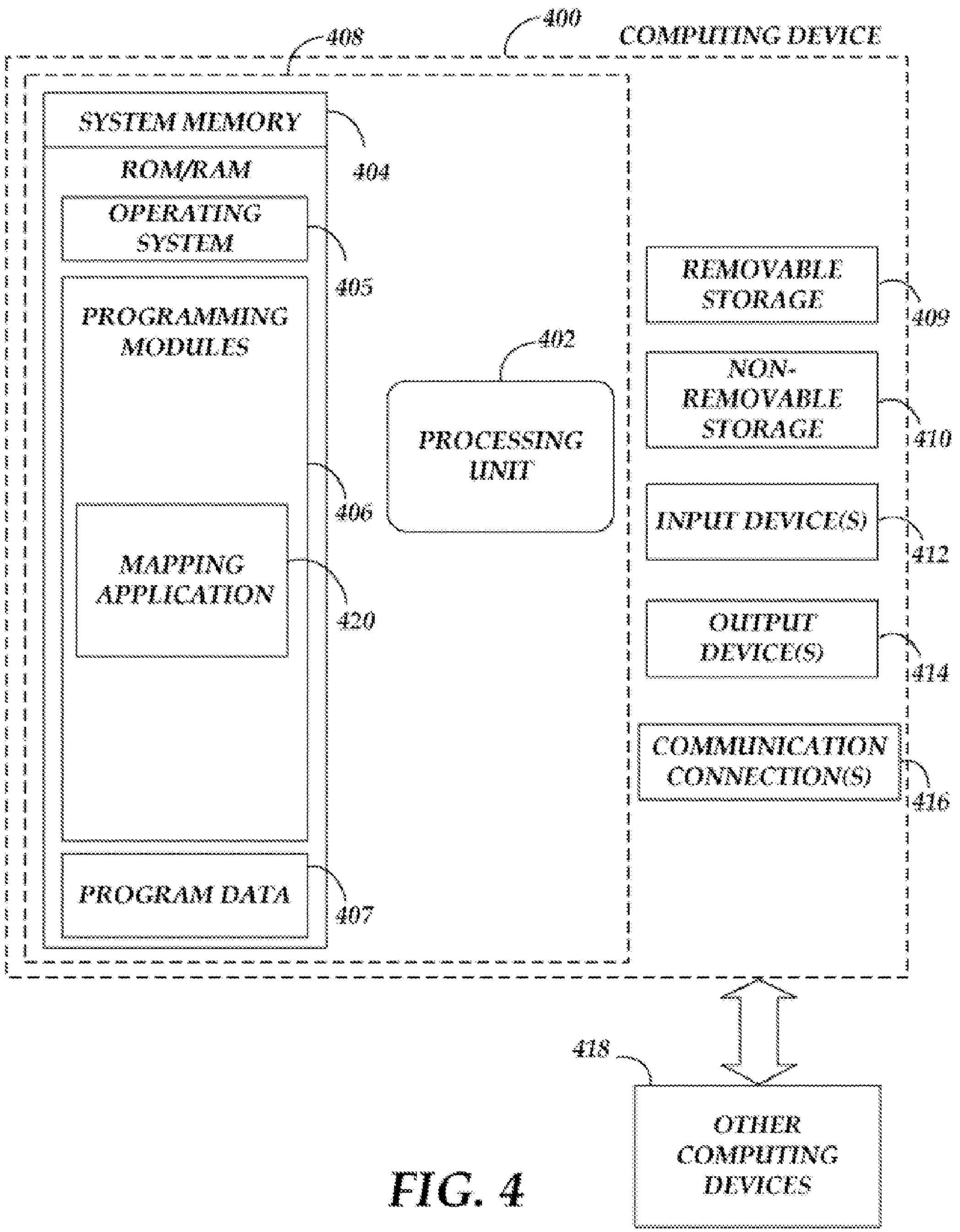
FIG. 4 is a block diagram of a system including a computing device.

FIG. 4 is a block diagram of a system including computing device 400. Consistent with an embodiment of the invention, the aforementioned memory storage and processing unit may be implemented in a computing device, such as computing device 400 of FIG. 4. Any suitable combination of hardware, software, or firmware may be used to implement the memory storage and processing unit. For example, the memory storage and processing unit may be implemented with computing device 400 or any of other computing devices 418 (e.g. backend 105), in combination with computing device 400. The aforementioned system, device, and processors are examples and other systems, devices, and processors may comprise the aforementioned memory storage and processing unit, consistent with embodiments of the invention. Furthermore, computing device 400 may comprise an operating environment for system 100 as described above. System 100 may operate in other environments and is not limited to computing device 400.

With reference to FIG. 4, a system consistent with an embodiment of the invention may include a computing device, such as computing device 400. In a basic configuration, computing device 400 may include at least one processing unit 402 and a system memory 404. Depending on the configuration and type of computing device, system memory 404 may comprise, but is not limited to, volatile (e.g. random access memory (RAM)), non-volatile (e.g. read-only memory (ROM)), flash memory, or any combination. System memory 404 may include operating system 405, one or more programming modules 406, and may include a program data 407. Operating system 405, for example, may be suitable for controlling computing device 400's operation. In one embodiment, programming modules 406 may include, for example, mapping application 420. Furthermore, embodiments of the invention may be practiced in conjunction with a graphics library, other operating systems, or any other application program and is not limited to any particular application or system. This basic configuration is illustrated in FIG. 4 by those components within a dashed line 408.

Computing device 400 may have additional features or functionality. For example, computing device 400 may also include additional data storage devices (removable and/or non-removable) such as, for example, magnetic disks, optical disks, or tape. Such additional storage is illustrated in FIG. 4 by a removable storage 409 and a non-removable storage 410. Computer storage media may include volatile and nonvolatile, removable and non-removable media implemented in any method or technology for storage of information, such as computer readable instructions, data structures, program modules, or other data. System memory 404, removable storage 409, and non-removable storage 410 are all computer storage media examples (i.e. memory storage). Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 400. Any such computer storage media may be part of device 400. Computing device 400 may also have input device(s) 412 such as a keyboard, a mouse, a pen, a sound input device, a touch input device, etc. Output device(s) 414 such as a display, speakers, a printer, etc. may also be included. The aforementioned devices are examples and others may be used.

Computing device 400 may also contain a communication connection 416 that may allow device 400 to communicate with other computing devices 418, such as over a network in a distributed computing environment, for example, an intranet or the Internet. Communication connection 416 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 404, including operating system 405. While executing on processing unit 402, programming modules 406 (e.g. mapping application 420) may perform processes including, for example, one or more method 200's stages as described above. The aforementioned process is an example, and processing unit 402 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present invention may be embodied in hardware and/or in software (including firmware, resident software, micro-code, etc.). In other words, embodiments of the present invention may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CO-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

All rights including copyrights in the code included herein are vested in and the property of the Applicant. The Applicant retains and reserves all rights in the code included herein, and grants permission to reproduce the material only in connection with reproduction of the granted patent and for no other purpose.

While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

What is claimed is:

1. A method for providing object model based mapping, the method comprising:

receiving backend data defining data constructs in a backend system;

receiving entity data defining data constructs in an entity model;

receiving user selectable elements defining a process associating the backend data with the entity data, the user selectable elements being configured to define a flow chart of the process, the flow chart of the process being represented as a state-machine diagram and being convertible into code; and producing the code, based on the received user selectable elements, configured to implement the process represented by the flow chart, wherein producing the code comprises producing code that allows data flow from the backend system to the entity model and from the entity model to the backend system based on the flow chart process as defined by the user selectable elements.

2. The method of claim 1, wherein receiving the backend data defining data constructs in the backend system comprises receiving the backend data configured to define the backend system.

3. The method of claim 1, wherein receiving the backend data defining data constructs in the backend system comprises receiving the backend data configured to define how to access the backend system.

4. The method of claim 1, wherein receiving the backend data defining data constructs in the backend system comprises receiving the backend data defining data constructs in the backend system comprising one of the following: a conceptual model; a relational database; and a set of application program interfaces (APIs).

5. The method of claim 1, wherein receiving the entity data defining data constructs in the entity model comprises receiving the entity data defining data constructs comprising one of the following: entity classes and data logical classes.

6. The method of claim 1, wherein receiving the user selectable elements defining the process comprises receiving the user selectable elements defining the process configured to allow data flow from the backend system to the entity model and between the entity model and the backend system.

7. The method of claim 1, wherein receiving the user selectable elements defining the process comprises receiving the user selectable elements defining the process configured to implement customer relationship management (CRM).

8. The method of claim 1, wherein receiving the user selectable elements defining the process comprises receiving the user selectable elements defining the process configured to map to a database on the backend system.

9. The method of claim 1, wherein receiving the user selectable elements defining the process comprises receiving the user selectable elements defining the process configured to perform at least one data type transformation.

10. The method of claim 1, wherein receiving the user selectable elements defining the process comprises receiving the user selectable elements defining the process configured to perform at least one data type transformation comprising at least one of the following: strings to guides; integers to strings; concatenation of types; and a mathematical transformation.

11. The method of claim 1, wherein receiving the user selectable elements defining the process comprises receiving the user selectable elements defining the flow chart of the process that defines a work flow between the backend system and the entity model.

12. The method of claim 1, wherein receiving the user selectable elements defining the process comprises receiving the user selectable elements defining the flow chart of the process comprising at least one activity describing the process.

13. The method of claim 1, wherein receiving the user selectable elements defining the process comprises receiving the user selectable elements defining the flow chart of the process further comprising a sequential process.

14. A system for providing object model based mapping, the system comprising:

a memory storage; and a processing unit coupled to the memory storage, wherein the processing unit is operative to execute code configured to implement a process, the code produced based on received user selectable elements building, within a user interface, a flow chart of the process being represented as a user-made state-machine diagram associating a backend data with an entity data, the flow chart of the process being convertible into the code, the code being configured to enable the processing unit to implement the process represented by the flow chart upon execution of the code, the backend data defining data constructs in a backend system and the entity data defining data constructs in an entity model, wherein the code produced allows data flow from the backend system to the entity model and from the entity model to the backend system based on the flow chart process as defined by the user selectable elements.

15. A computer-readable storage device which stores a set of instructions which when executed performs a method for providing object model based mapping, the method executed by the set of instructions comprising:

receiving backend data defining data constructs in a backend system, the backend data configured to define the backend system and to define how to access the backend system;

receiving entity data defining data constructs in an entity model, the entity data comprising one of the following: entity classes and data logical classes;

receiving user selectable elements defining a process associating the backend data with the entity data, the user selectable elements defining a flow chart of the process comprising at least one activity describing the process comprising a state machines process enabling bi-directional data transforms between the backend data and the entity data, the flow chart being configured to be translated to machine code for computer execution and being representative of a work flow between the backend system and the entity model; and producing code, based on the received user selectable elements, configured to implement the process, wherein producing the code comprises producing code that enables the bi-directional data transforms by allowing data flow from the backend system to the entity model and from the entity model to the backend system based on the flow chart process as defined by the user selectable elements.

16. The computer-readable storage device of claim 15, wherein receiving the backend data defining data constructs in the backend system comprises receiving the backend data defining data constructs in the backend system comprising one of the following: a conceptual model; a relational database; and a set of application program interfaces (APIs).

17. The computer-readable storage device of claim 15, wherein receiving the user selectable elements defining the process comprises receiving the user selectable elements defining the process configured to allow data flow from the backend system to the entity model and between the entity model and the backend system.

18. The computer-readable storage device of claim 15, wherein receiving the user selectable elements defining the process comprises receiving the user selectable elements defining the process configured to map to a database on the backend system.

19. The computer-readable storage device of claim 15, wherein receiving the user selectable elements defining the process comprises receiving the user selectable elements defining the process configured to perform at least one data type transformation.

20. The computer-readable storage device of claim 15, wherein receiving the user selectable elements defining the process comprises receiving the user selectable elements defining the process configured to perform at least one data type transformation comprising at least one of the following: strings to guides; integers to strings; concatenation of types; and a mathematical transformation.

* * * * *